May 28, 1968 — C. E. ALLEMAN ET AL — 3,384,974
PROCESS AND APPARATUS FOR WET PELLET DRYING
Original Filed Sept. 17, 1964 — 2 Sheets-Sheet 1

INVENTORS
C. E. ALLEMAN
R. A. FEWEL
BY Young & Quigg
ATTORNEYS

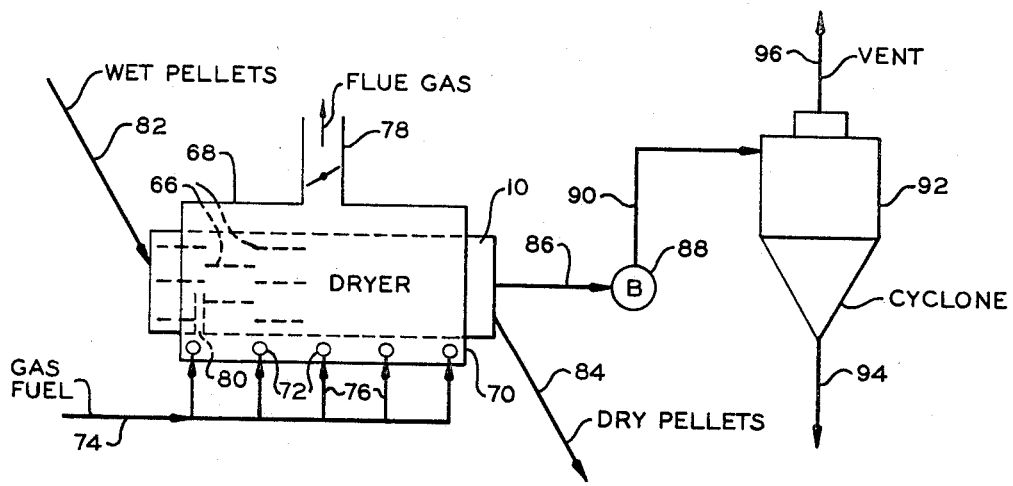
FIG. 2
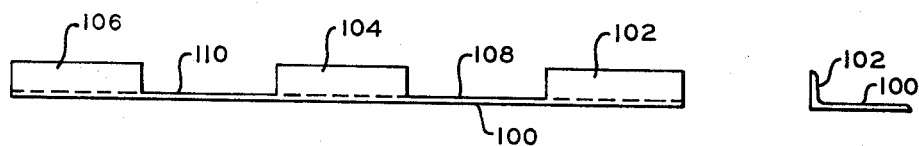
FIG. 5
FIG. 6
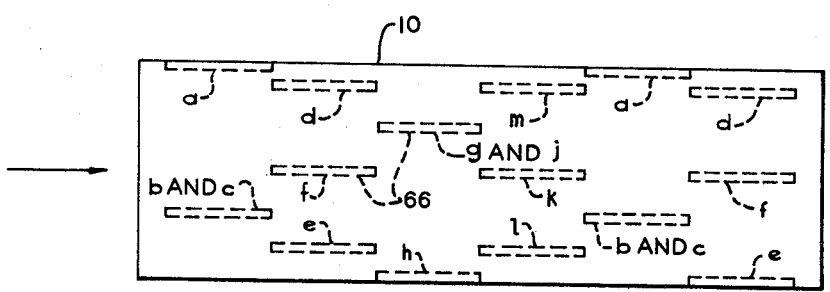
FIG. 3
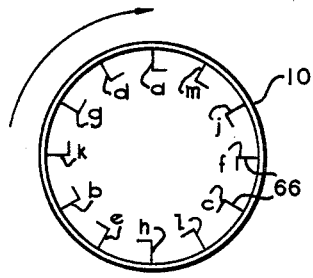
FIG. 4
INVENTORS
C.E. ALLEMAN
R.A. FEWEL
BY Young & Quigg
ATTORNEYS

United States Patent Office 3,384,974
Patented May 28, 1968

3,384,974
PROCESS AND APPARATUS FOR WET
PELLET DRYING
Carl E. Alleman and Robert A. Fewel, Bartlesville, Okla., assignors to Phillips Petroleum Company, a corporation of Delaware
Continuation of application Ser. No. 397,228, Sept. 17, 1964. This application Mar. 20, 1967, Ser. No. 624,623
9 Claims. (Cl. 34—31)

ABSTRACT OF THE DISCLOSURE

A horizontally rotating cylindrical drum dryer for drawing wet pelleted carbon black containing about 40 to 60 weight percent water is improved by providing lifting vanes or flights disposed in a substantial upstream section of the dryer, leaving the downstream section substantially unobstructed.

Figure 1:
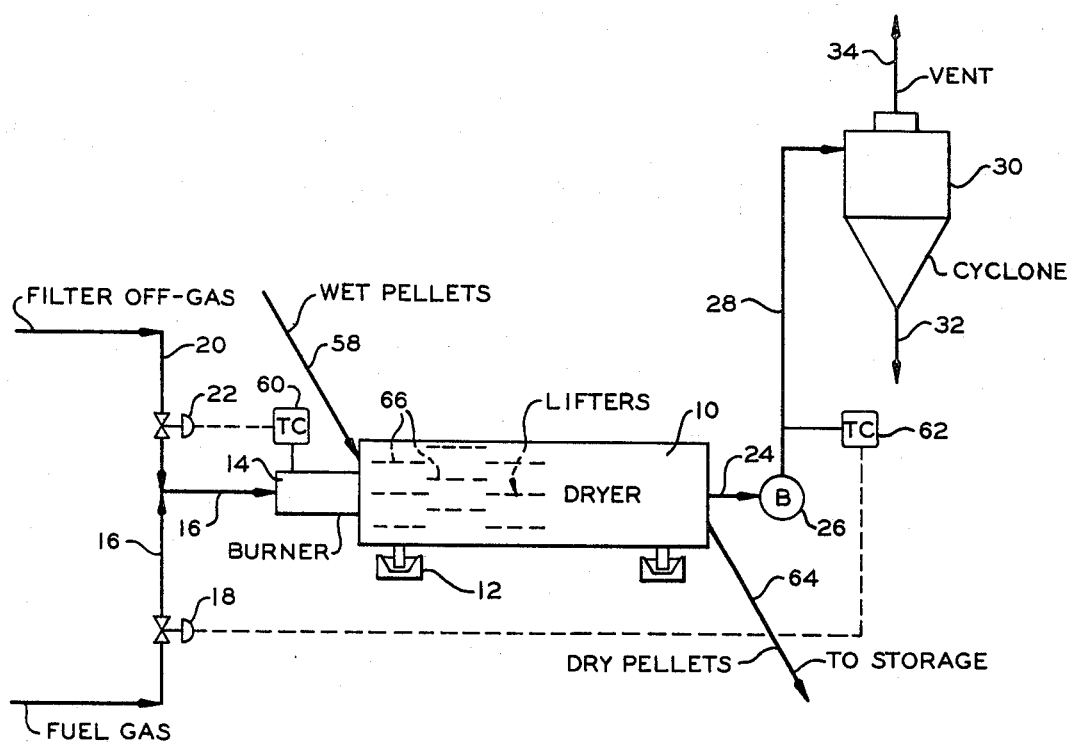

This application is a continuation of application Ser. No. 397,228, filed Sept. 17, 1964, now abandoned.

This invention relates to an improved process and apparatus for drying pelleted powdered solids. A specific aspect of the invention is concerned with the wet pelleting of carbon black with aqueous liquid and drying the wet pellets.

Conventional rotary dryers are utilized in drying wet pelleted carbon black and similar materials such as pelleted catalyst powders. In the drying of wet carbon black pellets in a standard rotary dryer such as that available from Bartlett and Snow, commonly called the Bartlett and Snow dryer, most of the heat for the drying process is supplied thru the dryer shell from an exteriorly fired furnace and jacket surrounding the dryer shell and only enough hot gas from the jacket or furnace is passed thru the interior of the dryer drum to purge the moisture therefrom. The indirect heating of the carbon black pellets thru the shell of the dryer has been considered necessary up to this time, first, because of the necessity of avoiding heavy product loss and excessive air pollution; and, second, because it was feared that the black would ignite if hot gases were passed over the carbon black in the drum at sufficient temperature to dry the carbon black in a reasonable period of time. It is well known that during the wet pelleting of carbon black with conventional hand regulation of the water and carbon black rates to the wet pelleter, excessive amounts of loose, unpelleted carbon black pass from the pelleter to the dryer during certain periods of operation when the control of the black and water rates are not properly regulated. Under such conditions, flowing of sufficient quantities of drying gas thru the dryer to all of the drying would create an insurmountable dust collection problem.

In view of the fact that carbon black stored at temperatures much above 500° F. eventually ignites spontaneously, it was feared that drying gas temperatures adequate for rapid drying of the carbon black pellets entirely by direct heat exchange within the dryer shell would ignite and consume a substantial proportion of the carbon black pellets in the dryer.

It is an object of the invention to provide an improved process and apparatus for drying wet pelleted particulate material such as carbon black. Another object is to provide a process and apparatus for drying wet pelleted carbon black which effect the drying entirely by direct heat exchange with a drying gas. A further object is to provide a combination process and apparatus for wet pelleting of carbon black and drying the resulting wet pellets entirely by direct heat exchange with a drying gas. Other objects of the invention will become apparent to one skilled in the art upon consideration of the accompanying disclosure.

It has been found that the control of wet pelleting of carbon black in accordance with the invention set forth in the application of C. E. Alleman, Ser. No. 269,248, filed Apr. 1, 1963 (now U.S. Patent 3,266,873), which is a continuation in part of application Ser. No. 128,445, filed Aug. 1, 1961, now abandoned, is so effective that hard, substantially dustless product pellets are produced without any loose flocculent carbon black being passed from the pelletizer. This type of wet pelleter makes it possible to pass the same thru a rotary drum dryer and accomplish the drying thereof with hot combustion gases without creating any appreciable dust collection problem with respect to the effluent drying gas. Substantially the only carbon black material which is removed from the dryer by the drying gas is abraded particles of the carbon black pellets which are sufficiently coarse to be readily removable in an ordinary cyclone separator whereas in drying wet pellets from a pelleting process in which the carbon black and water feed rates are hand regulated or controlled and only a small proportion of the heating is effected by direct contact with heating gas in the dryer, it is necessary to utilize a bag filter to recover the extremely fine carbon black dust in the purge gas or effluent drying gas.

In the aforesaid patent 3,266,873 the pelleter, which is of the pug mill type having mixing rods spirally arranged on an axial shaft within the mill, is operated by an electric motor provided with sensing and control equipment which senses the rate of power consumption and regulates either the flow rate of carbon black or the flow rate of water to the pug mill while maintaining the other flow rate constant or as nearly constant as feasible. Preferably the flow rate of carbon black is regulated as nearly constant as possible and the flow rate of water is varied as minor variations occur in the power consumption due to slight variations in flow of carbon black so as to maintain the power consumption relatively constant. The amount of water incorporated in the pellets is in the range of 40 to 60 wt. percent of the pellets. It has been found that this control system and method invariably produce an excellent substantially dust free pelleted product and the pellets are more nearly uniformly hard than in conventional processes.

The wet pelleted product from the automatically controlled wet pelleting process just described and further disclosed in the aforesaid patent is passed thru an elongated cylindrical drying drum rotating on its horizontal axis and provided with lifting flights on the inside of the drum for lifting a substantial proportion of the pellets in the drum at any given time to the uppermost level of the interior of the drum and to intermediate levels and gravitating the lifted pellets onto the bed of pellets in the bottom of the drum while passing hot drying gas longitudinally thru the drum. The drying gas is introduced at an initial temperature in the range of about 900 to 1600° F. and intimately contacts the gravitating pellets within the drum so as to effectively and rapidly dry same by driving off the volatile liquid therefrom. Any fines in the effluent drying gas from the drying drum are passed thru a cyclone filter to recover same and the recovered fines are returned to the pelleter for pelleting with the flocculent carbon black feed introduced theerto.

Figure 1A:
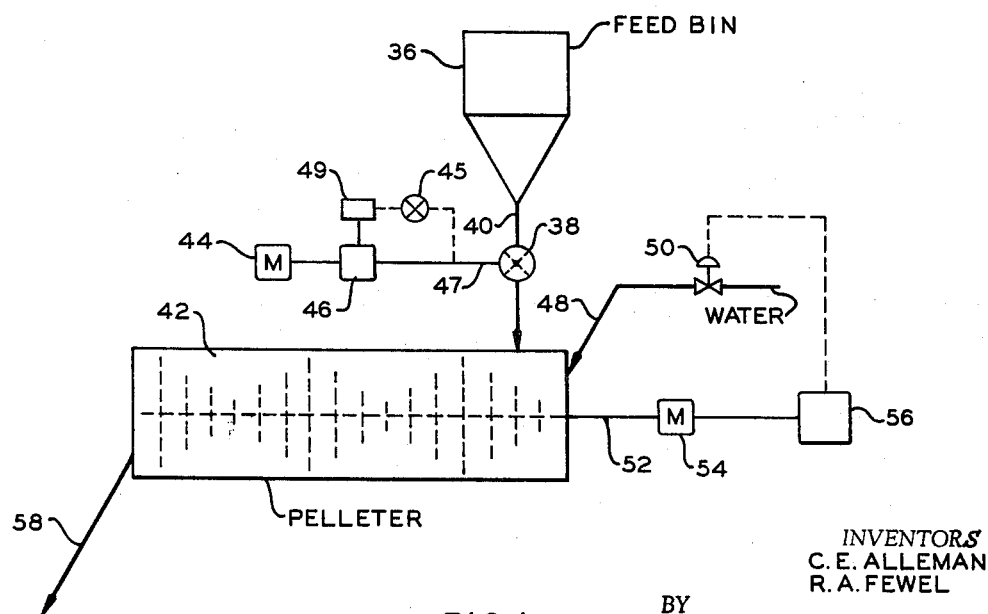

A more complete understanding of the invention may be had by reference to the accompanying schematic drawing of which FIGURES 1 and 1a show a preferred arrangement of apparatus for performing the process of the invention; FIGURE 2 shows an an arrangement of apparatus in which the invention is installed by modifying a conventional rotary dryer; FIGURE 3 is a side view of a dryer drum constructed in accordance with the invention; FIGURE 4 is an end view of the dryer of FIGURE 3; FIGURE 5 is a side view of one of the lifting elements of the flights shown in the preceding figures; and FIGURE 6 is an end view of the element of FIGURE 5.

In referring to FIGURES 1 and 1a, it is to be understood that the mill of FIGURE 1a is connected with the dryer of FIGURE 1 thru line 58. A rotary drying drum 10 is supported on rotating means 12 which is operated by any suitable means such as an electric motor (not shown). The feed end of the dryer is connected with a burner or furnace 14 which is supplied by fuel from a fuel gas line 16 containing a motor valve 18. The fuel gas is supplemented by off-gas from a carbon black filter at a temperature of about 500° F. thru line 20 which is provided with motor valve 22. Effluent gas from the dryer is withdrawn thru line 24 under the impetus of blower 26 and is passed thru line 28 thru cyclone separator 30 where the fines are recovered thru line 32, the clean gas being vented thru line 34.

The wet pellets which serve as feed for dryer 10 are prepared by passing dry flocculent carbon black from supply hopper 36 under the control of star valve 38 thru line 40 into the feed end of a pug mill 42. Star valve 38 is operated by motor 44 thru a speed reducer 46 to provide a substantially constant flow rate of carbon black. A speed transmitter 45 senses the speed of shaft 47 and transmits a signal proportional to the sensed speed to controller 49 which regulates speed reducer 46 to maintain a relatively constant speed of rotation of feeder 38. Water is fed to the feed end of the pug mill thru line 48 which is provided with a motor valve 50. The shaft 52 of pug mill 42 is operated by motor 54. A power sensor and controller 56 senses the power consumed by motor 54 and controls the rate of flow of water in line 48 by manipulating valve 50 in response to the sensed power so as to maintain said power relatively constant. This control system is fully disclosed in the aforesaid application. The carbon black is formed into hard wet pellets when passing thru pug mill 42 and the wet pelleted product is delivered thru line 58 into the feed end of dryer 10.

The inlet temperature of the drying gas passing from burner 14 into dryer 10 is controlled within the range of 900 to 1600° F. by sensing the temperature in the downstream end of burner 14 by means of a thermocouple within the burner (not shown) and the sensed temperature is transmitted to temperature controller 60 which is in control of motor valve 22. This arrangement introduces sufficient off-gas from line 20 into fuel line 16 at a temperature in the range of about 400–500° F. to provide the set temperature of instrument 60. Other relatively cool gas may be substituted for the bag filter off-gas in line 20, such as gas from line 34 vented from cyclone 30. It is advisable to control the air adjustment of burner 14 so that a rich mixture is burned leaving little or no oxygen in the combustion gas intoduced to the dryer.

A thermocouple in line 28 (not shown) is connected with temperature controller 62 which is in control of motor valve 18 in fuel line 16 and maintains a substantially constant temperature in the effluent gas in line 28 by increasing the fuel flow rate by manipulating valve 18 when the effluent gas temperature tends to drop below the set point of instrument 62 and decreasing the fuel flow rate when the sensed temperature is above the set point of the instrument. Thus, when the fuel flow rate is increased the temperature in the downstream end of burner 14 increases and temperature controller 60 increases the flow rate of tempering gas from line 20 which restores the set temperature of instrument 60 and the resulting inlet gas has a higher volume and flow rate at the set temperature which results in raising the effluent gas temperature in line 28. The reverse situation occurs when the sensed temperature in line 28 is above the set point of instrument 62.

The dry pellets from the process are passed thru line 64 to packaging or to storage or other disposal.

Dryer 10 is provided on the inner wall with lifters 66 for the purpose of providing better contact between the wet pellets and the drying gas. The preferred arrangement of the lifters and the structure thereof are discussed in detail in connection with FIGURES 3–6.

It should be noted that the drying gas and the wet pellets being dried in dryer 10 flow concurrently. This technique contacts the wettest pellets with the hottest gas and not only facilitates more rapid drying but avoids any possibility of igniting the pellets when there is a minor concentration of $O_2$ in the drying gas. It also permits exceptionally high inlet gas temperature, such as 1600° F., without having a deleterious effect on the carbon black and is conducive to exceptionally fast drying.

In FIGURE 2, a rotary dry dryer 10 is provided with a conventional jacket 68 which is stationary while the drum 10 revolves. The lower section of jacket 68 connects with a furnace section 70 provided with burners 72 which are fed fuel gas from line 74 by individual lines 76. Hot drying gas circulates around the outside of the rotating drum 10 and is vented thru stack 78. Gas is passed from jacket 68 and furnace 70 into the interior of drum 10 thru inlet 80 as is conventional in this type of jacketed dryer. Wet pellets from an automatically controlled wet pelleting system (described in connection with FIGURE 1) are fed thru line 82 into the interior of drum 10 and dry pellets are recovered through line 84.

The purge gas introduced to the interior of drum 10 is vented from the downstream end of the drum thru line 86 under the impetus of fan 88 and the carbon black-containing purge gas is passed thru line 90 and separator 92 to recover the fines thru line 94 and vent the clean gas thru line 96. Lifters 66 are also provided on the inner walls of drum 10 and are described below.

Referring to FIGURES 3, 4, 5, and 6 a series of lifters 66 in a specific pattern or arrangement are provided on the inner wall of drum 10 and in the forward end thereof as in the upstream ⅓ to ½ of the drum. The arrangement will be described in accordance with an installation in actual plant use but it is to be understood that the invention is not limited by the specific arrangement, dimensions and proportions described.

Lifters 66 are arranged in flights. These flights are fabricated from 10 gauge stainless steel and begin approximately 6–8 inches from the inlet end of a 60 foot long cylindrical drum 7 feet in diameter. The flights extend half-way thru the length of the dryer. The successive lifters in each flight are offset 30° from the preceding lifter and each lifter except the first begins at the downstream end of the preceding lifter so as to form a spiral or helical pattern. The lifters in successive flights are spaced 120° apart, thus forming 3 separate flights extending from the approximate forward end of the drum to the center thereof. In FIGURE 4 the lifters are designated A, D, G, K, B, E, H, L, C, F, J, and M in a counterclockwise direction. Lifters A, D, G, K, B, and E form one of the flights spiralling around the drum as illustrated in FIGURE 3. Another flight begins at the forward end of the drum and includes lifters B, E, H, L, C, and F, while a third flight includes C, F, J, M, A, and D. It should be noted in FIGURE 3 that B and C are directly in line with each other on opposite sides of the drum and this is also true of G and J.

FIGURES 5 and 6 show the preferred structure of the lifters which are formed of a radially inwardly extending ledge 100 having attached thereto and integral therewith upwardly extending lip or flange sections 102, 104, and 106. The lip sections are spaced apart leaving open sections 108 and 110 so that a portion of the elevated pellets roll off the lifters thru the open spaces before the lifter reaches the upper-most section of the drum while the major portion of the pellets behind the lip sections are retained until the lifter passes the upper-most position in the drum. This creates gravitating curtains of pellets thru the half section of the drying chamber adjacent or bounded by the upturning side of the drum. The drum illustrated in FIGURE 4 turns clockwise during operation in order to elevate and gravitate the pellets during the drying operation.

In the application being described the lifters 66 are each 5 feet in length and ledge 100 is 4 inches wide. The upturned sections or lips are each 1 foot in length by 1 inch in height, leaving open spaces of 1 foot intermediate the lips. It is to be understood that the upturned lip on the lifters may be continuous, but the discontinuous structure described is highly advantageous in distributing the gravitating pellets over a substantially greater section of the drying chamber, thus increasing the efficiency of contacting and direct heat exchange with the drying gas passing thru the drum or drying chamber.

The drying capacity of the dryer disclosed and described is 4000 lbs./hr. utilizing lifting flights in the forward 30 feet of the drum as illustrated in FIGURE 1 and utilizing the lifters illustrated in the drawing.

Certain modifications of the invention will become apparent to those skilled in the art and the illustrative details disclosed are not to be construed as imposing unnecessary limitations on the invention.

We claim:
1. Apparatus for drying wet pellets of carbon black containing from 40 to 60 weight percent water, which comprises:
   (1) an elongated horizontal cylindrical drum rotatable about its horizontal axis having an inlet for wet pellets in the upstream end and an outlet for dry pellets in the downstream end thereof;
   (2) means for passing hot drying gas longitudinally thru said drum in direct contact with the pellets; and
   (3) a series of lifting flights on the inner wall of said drum comprising circumferentially spaced-apart radially extending substantially rectangular plates longitudinally positioned on the inner wall of said drum having upturned inner edges when on the upwardly rotating section of the drum for lifting at least a substantial proportion of the pellets about 180° during drum rotation and dropping same to the lower section of the drum, said flights extending thru only a substantial upstream section of said drum, the remaining inner wall of said drum being unobstructed.

2. The apparatus of claim 1 wherein each flight comprises several substantially rectangular plates, the first plate being near the upstream end of said drum, the second plate continuing downstream from the downstream end of the first to the upstream end of the third plate, and so on, the successive plates in each flight being offset a substantial portion of the circumference from each other to form a helical pattern, the first plate in each successive flight being offset circumferentially from the first plate of the preceding flight.

3. The apparatus of claim 1 wherein the upturned edges of said plates are discontinuous with upturned sections being spaced substantially from each other by intervening blank spaces so that a portion of the pellets lifted by said plates roll off thru the intervening blank spaces before being raised to the top of the drum and another portion is retained by said upturned sections until reaching the top of the drum.

4. The apparatus of claim 1 including a furnace jacket surrounding the major portion of said drum, provided with heating means for heating the outside of said drum, the means of (2) comprising first conduit means communicating said jacket with the interior of said drum and second conduit means leading from one end of said drum.

5. The apparatus of claim 1 in combination with
   (4) pelleting means for loose flocculent carbon black comprising:
      (a) a pug mill having an inlet for carbon black and an inlet for water at one end, an outlet for wet pellets at the other end, and a rotatable axial shaft having mixing pins thereon;
      (b) an electric motor operatively connected to rotate said shaft;
      (c) power sensing means operatively connected with said motor;
      (d) a water line having a motor valve therein connected with the water inlet of said pug mill;
      (e) a source of carbon black connected by conduit with the carbon black inlet of said pug mill and flow control means in said conduit;
      (f) means for regulating one of the motor valves of (d) and the flow control means of (e) in response to the power sensing means of (c) while maintaining the other relatively constant so as to maintain the power consumed by said motor relatively constant under proper pelleting conditions; and
      (g) conduit means connecting the wet pellet outlet of (a) with the wet feed inlet of (1).

6. A process for drying wet-pelleted carbon black pellets containing from 40 to 60 weight percent water, comprising the steps of:
   (1) feeding said pellets into the upstream end of an elongated cylindrical drum rotating about its axis in substantially horizontal position;
   (2) passing said pellets thru said drum to an outlet in the downstream end thereof and, only in a substantial upstream section of said drum, simultaneously lifting substantial portions of said pellets along the wall of said drum to different upper levels therein and gravitating the elevated pellets to a bed of pellets in the bottom section of said drum wherein portions gravitated from intermediate levels are alternated longitudinally of said drum to provide radially spaced-apart curtains of gravitating pellets only in the upstream ⅓ to ½ of said drum;
   (3) simultaneously passing hot drying gas longitudinally thru said drum in direct contact with the gravitating pellets of step (2) so as to dry same; and
   (4) recovering dried pellets from the outlet of step (2).

7. The process of claim 6 wherein said drying gas comprises essentially combustion gas at an inlet temperature in the range of about 900 to 1600° F. and said gas is passed downstream thru said drum.

8. The process of claim 6 wherein said drum is heated externally to assist in drying said pellets.

9. In combination with the process of claim 6, the method of producing the wet pellets fed to step (1) comprising the steps of:
   (5) feeding separate streams of dry flocculent carbon black and water into one end of a horizontally rotating pug mill operated by an electric motor so as to form wet carbon black pellets;
   (6) sensing the power consumed by said motor under good pelleting conditions; and
   (7) regulating one of the feed rates of the stream of carbon black and the stream of water while maintaining the other relatively constant in response to the sensed power of step (6) so as to maintain the power consumed relatively constant and the water content of said pellets in the range of 40 to 60 weight percent.

References Cited

UNITED STATES PATENTS

| | | | |
|---|---|---|---|
| 765,997 | 7/1904 | Shellaberger | 263—34 |
| 1,105,812 | 8/1914 | McKaig | 259—3 |
| 2,486,205 | 10/1949 | Prosk | 263—22 |
| 2,952,921 | 9/1960 | Wodd et al. | 34—137 |
| 2,959,869 | 11/1960 | Ackerman | 34—135 |
| 3,168,383 | 2/1965 | Loewen | 34—33 |
| 3,204,341 | 9/1965 | Whitsel | 34—136 |

MARTIN P. SCHWADRON, *Primary Examiner.*

B. L. ADAMS, *Assistant Examiner.*